No. 649,934. Patented May 22, 1900.
T. R. JAMES.
MICROMETER ATTACHMENT FOR TOOLS.
(Application filed Jan. 29, 1900.)
(No Model.)
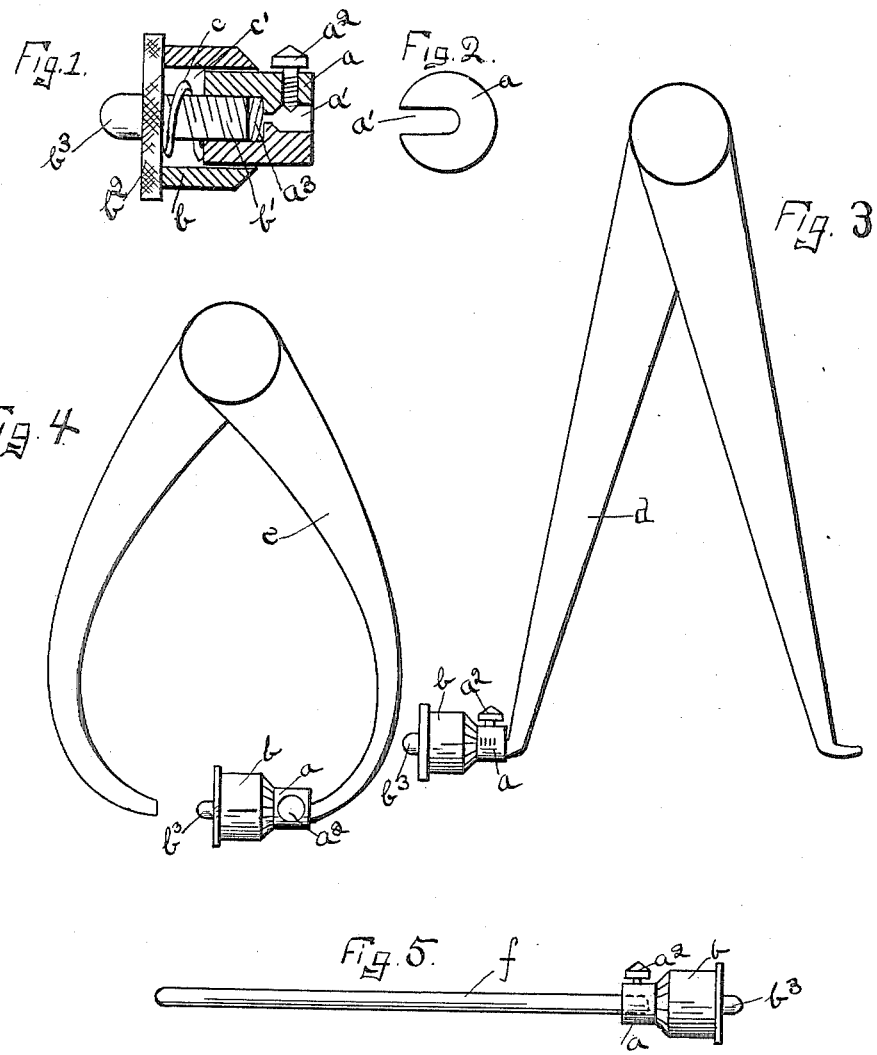
WITNESSES:
H. W. Belfield
M. R. Rochford
INVENTOR.
Thomas R. James
BY Jones + Addington
ATTORNEYS.

UNITED STATES PATENT OFFICE.

THOMAS R. JAMES, OF CHICAGO, ILLINOIS.

MICROMETER ATTACHMENT FOR TOOLS.

SPECIFICATION forming part of Letters Patent No. 649,934, dated May 22, 1900.

Application filed January 29, 1900. Serial No. 3,159. (No model.)

*To all whom it may concern:*

Be it known that I, THOMAS R. JAMES, a citizen of the United States, residing at Chicago, in the county of Cook and State of Illinois, have invented a certain new and useful Improvement in Micrometer Attachments for Tools, of which the following is a full, clear, concise, and exact description, reference being had to the accompanying drawings, forming a part of this specification.

My invention relates to a micrometer attachment for calipers or other measuring devices.

Accurate measurement with calipers is extremely difficult to obtain, and the small size, time required in adjusting, and cost of micrometers make their use difficult in many cases and impracticable in others. In accordance with my invention I provide means, in combination with a pair of calipers or other measuring device, whereby accurate inside and outside measurements may be taken without loss of time upon work of any dimensions.

The smallness and simplicity of my invention in its preferred form enables it to be sold at comparatively-small cost, and its construction permits it to be attached to any form of caliper or other tool and detached therefrom in short time.

My invention in its preferred form consists of a small body, usually circular, with means of attachment to the tool, and a micrometer-head working in the usual manner by means of a screw on said body.

I have illustrated my invention in the accompanying drawings, in which—

Figure 1 is an enlarged view of the device of my invention in section. Fig. 2 is an end view of the same. Fig. 3 is a view of the device of my invention applied to a pair of inside calipers. Fig. 4 is a view of the device of my invention applied to a pair of outside calipers, and Fig. 5 is a view thereof applied to a rod to form an inside caliper of small variation.

Like letters refer to like parts in the several figures.

In accordance with my invention in its preferred form I provide a steel body $a$, graduated on the exterior, having at one end the hole $a'$, adapted to inclose the point of a caliper or other measuring device, and a thumb-screw $a^2$ for clamping said point. At the other end of the body $a$ is the tapped hole $a^3$. A graduated micrometer head or thimble $b$ is adapted to fit upon the body $a$ and move along said body by means of the screw $b'$, fitting in the tapped hole $a^3$. The head $b$ is to be revolved by means of the knurled ring $b^2$. A contact-point $b^3$ is mounted on the exterior of the micrometer-head at its center. A spring $c$ is provided adapted to fit in a cavity $c'$ between the micrometer-head and the body to obviate all backlash.

While I have illustrated and described one specific form of micrometer-head and attachment, my invention is equally applicable to other forms of mounting.

The operation of my invention is plain from the drawings and their explanation. The micrometer attachment is fitted onto a point of a caliper or other measuring device and secured thereto by means of the thumb-screw. The micrometer-point may then be adjusted to secure the desired distance between the micrometer-point and the coacting point of the tool.

In Fig. 3 I have illustrated the micrometer attachment as applied to one of the points of a pair of inside calipers $d$, and in Fig. 4 I have illustrated the same as applied to a pair of outside calipers $e$. In Fig. 5 I have illustrated the same as applied to the end of a measuring-rod or distance-piece $f$.

Having described my invention, what I claim as new, and desire to secure by Letters Patent, is—

1. A micrometer attachment for calipers and other measuring tools comprising a body and a micrometer-head mounted upon and rotating about said body, said body being provided with a socket for the reception of the end of the tool, and suitable clamping means for securing the end of the tool in said socket, substantially as described.

2. The combination with a pair of calipers, or other measuring device, of the body $a$, the openings $a'$ and $a^3$ in said body, the head $b$, the contact-point $b^3$ thereon, and the thumb-screw $a^2$, substantially as described.

In witness whereof I have hereunto subscribed my name in the presence of two witnesses.

THOMAS R. JAMES.

Witnesses:
RICHARD E. JAMES,
W. CLYDE JONES.